United States Patent
Whightsil, Sr.

[11] Patent Number: 5,433,423
[45] Date of Patent: * Jul. 18, 1995

[54] ELASTOMERIC STRUT FOR AN ELASTOMERIC RISER TENSIONER

[75] Inventor: Gary L. Whightsil, Sr., Kennedale, Tex.

[73] Assignee: Continental Emsco Company, Garland, Tex.

[*] Notice: The portion of the term of this patent subsequent to Apr. 5, 2011 has been disclaimed.

[21] Appl. No.: 179,533

[22] Filed: Jan. 10, 1994

Related U.S. Application Data

[63] Continuation of Ser. No. 17,332, Feb. 11, 1993, Pat. No. 5,299,790, which is a continuation of Ser. No. 760,940, Sep. 17, 1991, abandoned.

[51] Int. Cl.⁶ ............................................. F16F 7/12
[52] U.S. Cl. ................................. 267/141; 267/35; 267/293; 267/294
[58] Field of Search .............. 267/152, 153, 294, 279, 267/280, 281, 282, 64.19, 64.23, 64.27, 35, 64.28, 141.1-141.7, 64.24, 64.26, 64.21, 292

[56] References Cited

U.S. PATENT DOCUMENTS

| | | | |
|---|---|---|---|
| 2,068,279 | 1/1937 | Piron | 267/141.1 |
| 2,762,600 | 9/1956 | Mordarski et al. | 267/141.5 |
| 2,927,786 | 3/1960 | Templeton | 267/8 |
| 3,831,920 | 8/1974 | Meldrum et al. | 267/137 |
| 3,831,922 | 8/1974 | Appleton | 267/140 |
| 4,084,801 | 4/1978 | Landers et al. | 267/140 |
| 4,577,842 | 3/1986 | Shtarkman | 267/140.1 |
| 4,603,843 | 8/1988 | Bechu | 267/35 |
| 4,662,791 | 5/1987 | Spicer | 405/212 |

FOREIGN PATENT DOCUMENTS

| | | |
|---|---|---|
| 698953 | 10/1953 | United Kingdom. |
| 2000253A | 1/1979 | United Kingdom. |
| WO90/14528 | 11/1990 | WIPO. |

*Primary Examiner*—Matthew C. Graham
*Attorney, Agent, or Firm*—Arnold, White & Durkee

[57] ABSTRACT

To overcome problems with the pistons of an energy cell rotating and becoming misaligned with one another in response to the forces exerted on the energy cell by a riser tensioner system, a two-piece elastomeric spring is disposed about each piston to create an elastomeric strut. Each piece of the spring is composed of a plurality of elastomeric layers separated by relatively inelastic spacers. These springs facilitate the longitudinally flexing of the elastomeric strut while substantially preventing rotation and misalignment in the radial direction.

5 Claims, 5 Drawing Sheets

PRIOR ART

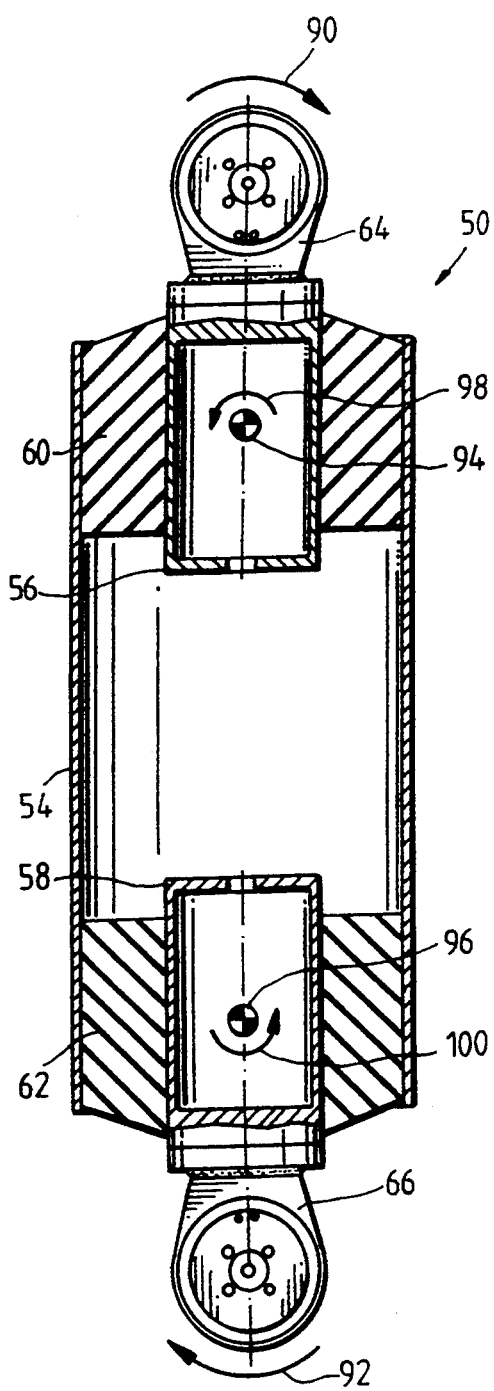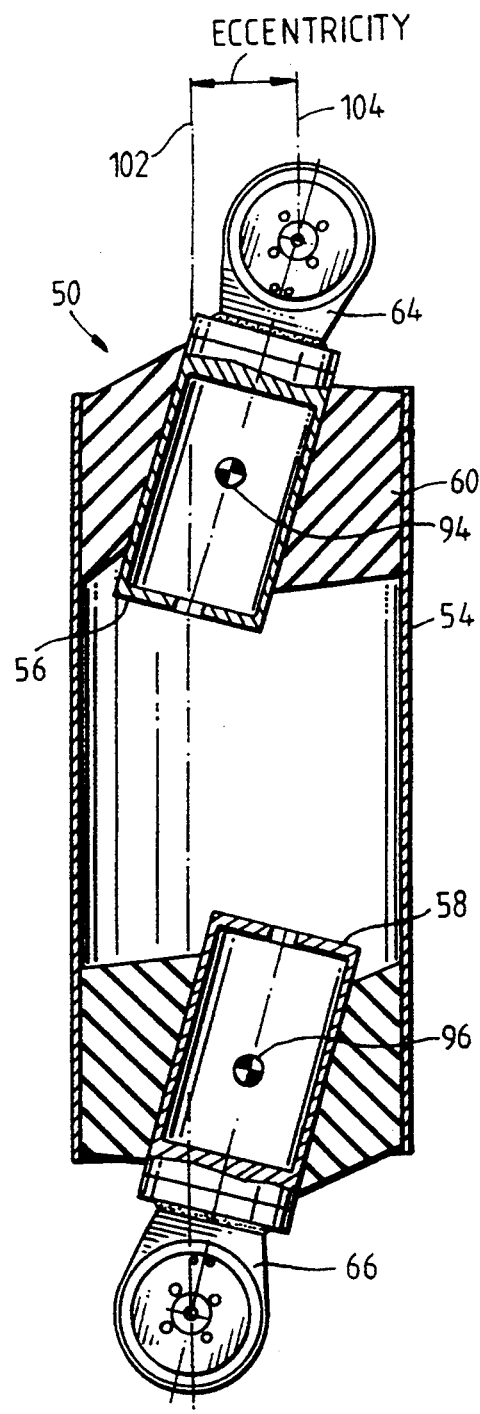
Fig. 3
PRIOR ART
Fig. 4
PRIOR ART

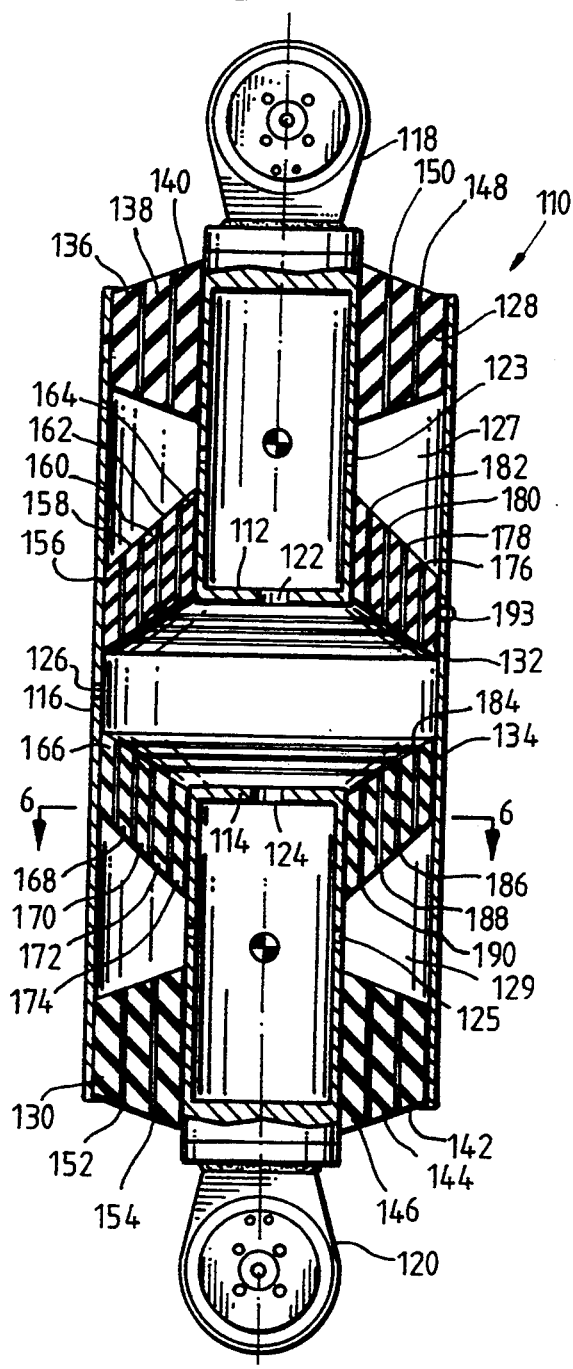
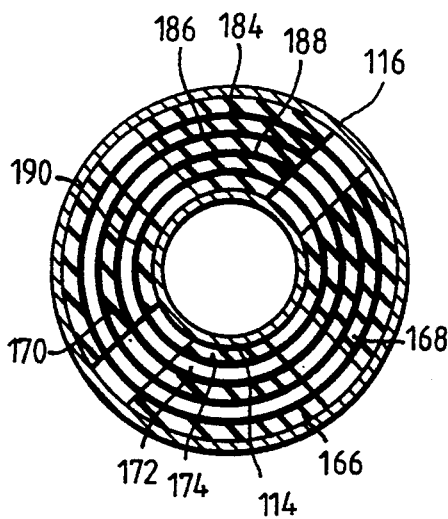
Fig. 5
Fig. 6

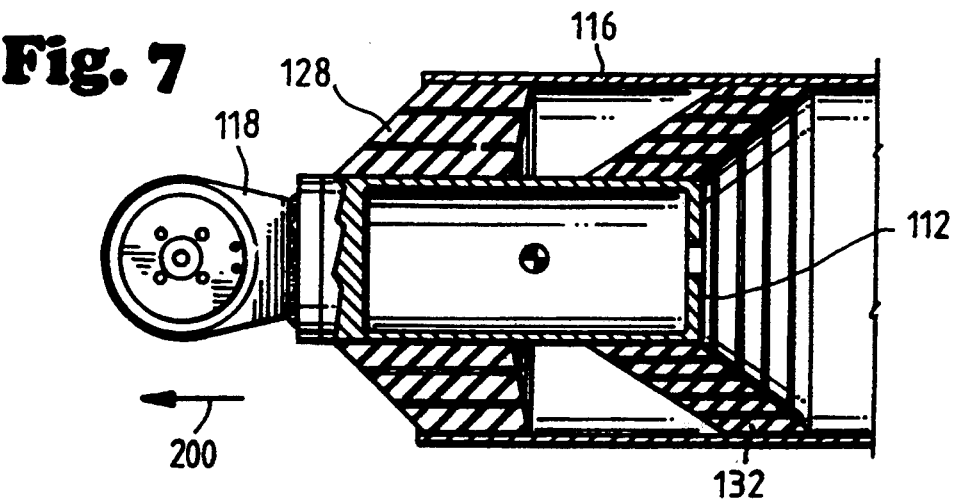
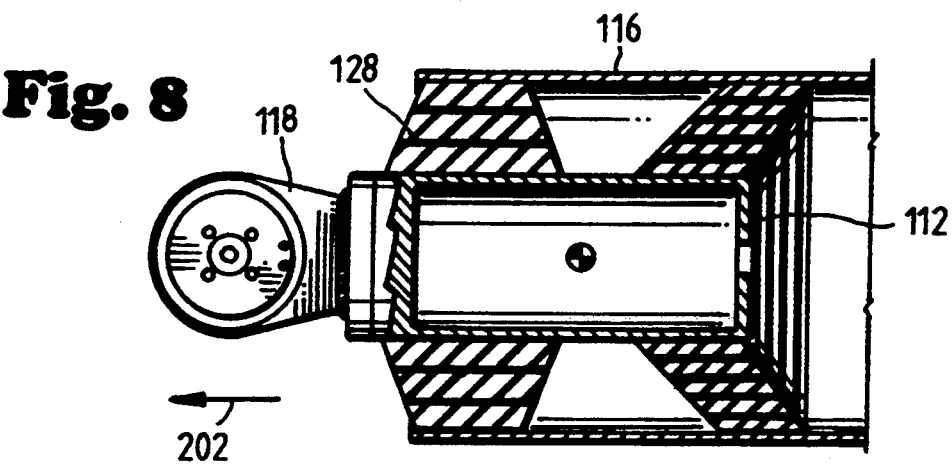
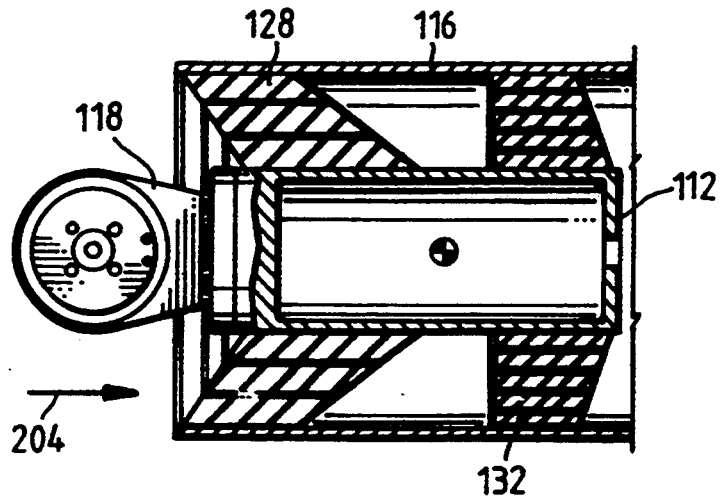

ELASTOMERIC STRUT FOR AN ELASTOMERIC RISER TENSIONER

This application is a continuation of application Ser. No. 08/017,332, filed Feb. 11, 1993 now U.S. Pat. No. 5,299,790 which is a continuation of application Ser. No. 760,940 filed Sep. 17, 1991, now abandoned.

BACKGROUND OF THE INVENTION

1. Field of the Invention

The present invention relates generally to riser tensioner systems for use on offshore platforms and, more particularly, to an elastomeric strut, for use in riser tensioner systems, that includes elastomeric members which effectively prevent the piston of the strut from becoming misaligned with the cylinder of the strut.

2. Description of the Related Art

Increased oil consumption and rising oil prices have led to exploration drilling and production in geographic locations that were previously considered to be economically unfeasible. As is to be expected, drilling and production under these difficult conditions lead to problems that are not present under more ideal conditions. For example, an increasing number of exploratory wells are located in offshore locations in order to tap more oil and gas reservoirs. These exploratory wells are generally drilled and then brought into production from floating platforms that produce a set of problems peculiar to the offshore drilling and production environment.

Offshore drilling and production operations require the use of pipe strings that extend from equipment on the sea floor to the floating platform. These vertical pipe strings, typically called risers, convey materials and fluids from the sea floor to the platform, and vice versa, as the particular application requires. The lower end of the riser is connected to the well head assembly adjacent the ocean floor, and the upper end usually extends through a centrally located opening in the hole of the floating platform.

As drilling and production operations progress into deeper waters, the length of the riser increases. Consequently, its unsupported weight also increases. Structural failure of the riser may result if compressive stresses in the elements of the riser exceed the metallurgical limitations of the riser material. Another potential failure results from the buckling of the relatively long, thin columns that make up the riser. Therefore, mechanisms have been devised in order to avoid these types of riser failures.

In an effort to minimize the compressive stresses and to eliminate, or at least postpone, structural failure, buoyancy or ballasting elements are attached to the submerged portion of the riser. These elements are usually comprised of syntactic foam elements, or of individual buoyancy or ballasting tanks, formed on the outer surface of the riser sections. Unlike the foam elements, the tanks are capable of being selectively inflated with air or ballasted with water by using the floating vessel's air compression equipment. These buoyancy devices create upwardly directly forces in the riser and, thereby, compensate for the compressive stresses created by the weight of the riser. However, experience shows that these types of buoyancy devices do not adequately compensate for the compressive stresses and other forces experienced by the riser.

To further compensate for the potentially destructive forces that attack the riser, the floating vessels incorporate other systems. Since the riser is fixedly secured at its lower end to the well head assembly, the floating vessel will move relative to the upper end of the riser due to wind, wave, and tidal oscillations normally encountered in the offshore drilling environment. Typically, lateral excursions of the drilling vessel are prevented by a system of mooring lines and anchors, or by a system of dynamic positioning thrusters, which maintain the vessel in a position over the subsea wellhead assembly. Such positioning systems compensate for normal current and wind loading, and prevent riser separation due to the vessel being pushed away from the well head location. However, these positioning systems do not prevent the floating vessels from oscillating upwardly and downwardly due to the wave and tidal oscillations. Therefore, the riser tensioning systems on the vessels are primarily adapted to maintain an upward tension on the riser throughout the range of longitudinal oscillations of the floating vessel. This type of mechanism applies an upward force to the upper end of the riser, usually by means of a cable or a sheave connected between the vessel and the upper end of the riser. Alternatively, pneumatic, hydraulic, and elastomeric cylinders are becoming increasingly popular in riser tensioner systems.

Since hydraulic and pneumatic tensioning systems are large, heavy, and require extensive support equipment and maintenance, newly developed tensioner systems often rely on elastomeric springs. The elastomeric riser tensioner systems provide ease of installation, require minimal maintenance, and offer simple designs with few moving parts. These springs operate passively in that they do not require a constant input energy from an external source. Moreover, the elastomeric systems do not burden the floating platform with an abundance of peripheral equipment that hydraulic systems need in order to function.

While the elastomeric systems overcome many of the problems associated with prior systems, elastomeric systems are not problem-free. The designers of the elastomeric systems expected or recognized that these systems suffered from certain shortcomings, even with respect to the prior art systems mentioned above. Thus, the designers continue to improve the elastomeric systems to minimize these recognized shortcomings. However, designers are continuing to discover new problems with elastomeric systems that should be solved in order to advance the effectiveness of elastomeric systems. The present invention is directed to overcoming, or at least minimizing, one or more of these problems and shortcomings.

SUMMARY OF THE INVENTION

In accordance with one aspect of the present invention, an elastomeric tension strut is provided. The strut includes a cylindrical housing having an elongated inner surface forming a cavity therein, having a first end portion and a second end portion, and having a longitudinal axis extending from the first end portion to the second end portion.

A first piston is adapted to move along the longitudinal axis within the first end portion of the housing. The first piston has a longitudinally outer end portion and a longitudinally inner end portion. The longitudinally outer end portion of the first piston defines a first end of the strut. A second piston is adapted to move along the longitudinal axis within the second end portion of the housing. The second piston has a longitudinally outer end portion and a longitudinally inner end portion. The longitudinally outer end portion of the second piston defines a second end of the strut. A gas cavity is formed within the housing between the longitudinally inner end portion of the first piston and the longitudinally inner end portion of the second piston.

A first main spring is generally annular in shape and has a radially inward surface and a radially outward surface. The radially inward surface of the first main spring is coupled to the longitudinally outer end portion of the first piston and the radially outward surface of the first main spring is coupled to the inner surface within the first end portion of the housing. A second main spring is generally annular in shape and has a radially inward surface and a radially outward surface. The radially inward surface of the second main spring is coupled to the longitudinally outer end portion of the second piston and the radially outward surface of the second main spring is coupled to the inner surface within the second end portion of the housing.

A first secondary spring is generally annular in shape and has a radially inward surface and a radially outward surface. The radially inward surface of the first secondary spring is coupled to the longitudinally inner end portion of the first piston and the radially outward surface of the first secondary spring is coupled to the inner surface within the first end portion of the housing. A second secondary spring is generally annular in shape and has a radially inward surface and a radially outward surface. The radially inward surface of the second secondary spring is coupled to the longitudinally inner end portion of the second piston and the radially outward surface of the second secondary spring is coupled to the inner surface within the second end portion of the housing.

Preferably, each of the springs includes a plurality of annular elastomeric layers. Each of the plurality of annular elastomeric layers is separated from one another by a respective one of a plurality of annular spacers being bonded thereto. The annular spacers are relatively inelastic as compared with the annular elastomeric layers and, thus, prevent the pistons from rotating within the cylindrical housing perpendicularly to the longitudinal axis.

In accordance with another aspect of the present invention, an elastomeric tension strut is provided that includes a cylindrical housing having an elongated inner surface forming a cavity therein, having a first end portion and a second end portion, and having a longitudinal axis extending from the first end portion to the second end portion.

A first piston is adapted to move between an extended position and a retracted position along the longitudinal axis within the first end portion of the housing. The first piston has a longitudinally outer end portion and a longitudinally inner end portion. The longitudinally outer end portion defines a first end of the strut. A second piston is adapted to move between an extended position and a retracted position along the longitudinal axis within the second end portion of the housing. The second piston has a longitudinally outer end portion and a longitudinally inner end portion. The longitudinally outer end portion of the second piston defines a second end of the strut. A gas cavity is formed within the housing between the longitudinally inner end portion of the first piston and the longitudinally inner end portion of the second piston.

A first main spring is generally annular in shape and has a radially inward surface and a radially outward surface. The radially inward surface of the first main spring is coupled to the longitudinally outer end portion of the first piston and the radially outward surface of the first main spring is coupled to the inner surface within the first end portion of the housing such that the first main spring flexes longitudinally outwardly when the first piston is in its extended position and flexes longitudinally inwardly when the first piston is in its retracted position.

A second main spring is generally annular in shape and has a radially inward surface and a radially outward surface. The radially inward surface of the second main spring is coupled to the longitudinally outer end portion of the second piston and the radially outward surface of the second main spring is coupled to the inner surface within the second end portion of the housing such that the second main spring flexes longitudinally outwardly when the second piston is in its extended position and flexes longitudinally inwardly when the second piston is in its retracted position.

A first secondary spring is generally annular in shape and having a radially inward surface and a radially outward surface. The radially inward surface of the first secondary spring is coupled to the longitudinally inner end portion of the first piston and the radially outward surface of the first secondary spring is coupled to the inner surface within the first end portion of the housing such that the first secondary spring flexes longitudinally outwardly when the first piston is in its extended position and exhibits substantially no longitudinal flexion when the first piston is in its retracted position.

A second secondary spring is generally annular in shape and has a radially inward surface and a radially outward surface. The radially inward surface of the second secondary spring is coupled to the longitudinally inner end portion of the second piston and the radially outward surface of the second secondary spring is coupled to the inner surface within the second end portion of the housing such that the second secondary spring flexes longitudinally outwardly when the second piston is in its extended position and exhibits substantially no longitudinal flexion when the second piston is in its retracted position.

BRIEF DESCRIPTION OF THE DRAWINGS

The foregoing and other advantages of the invention will become apparent upon reading the following detailed description and upon reference to the drawings in which:

FIG. 3 illustrates the forces encountered by the energy cell of FIG. 2 when connected to a riser tensioner system, such as the system illustrated in FIG. 1;

FIG. 4 illustrates the rotation and misalignment of the energy cell produced by the forces illustrated in FIG. 3;

FIG. 5 illustrates a cross-sectional view of an elastomeric tension strut having a plurality of elastomeric springs and a gas spring in accordance with the present invention;

FIG. 6 illustrates a cross-sectional view of the strut taken along line 6—6 in FIG. 5;

FIG. 7 illustrates an end portion of the strut of FIG. 5 in a fully extended position;

FIG. 8 illustrates an end portion of the strut of FIG. 5 in a nominal or rest position;

FIG. 9 illustrates an end portion of the strut of FIG. 5 in a fully compressed position.

Figures 1, 1A:
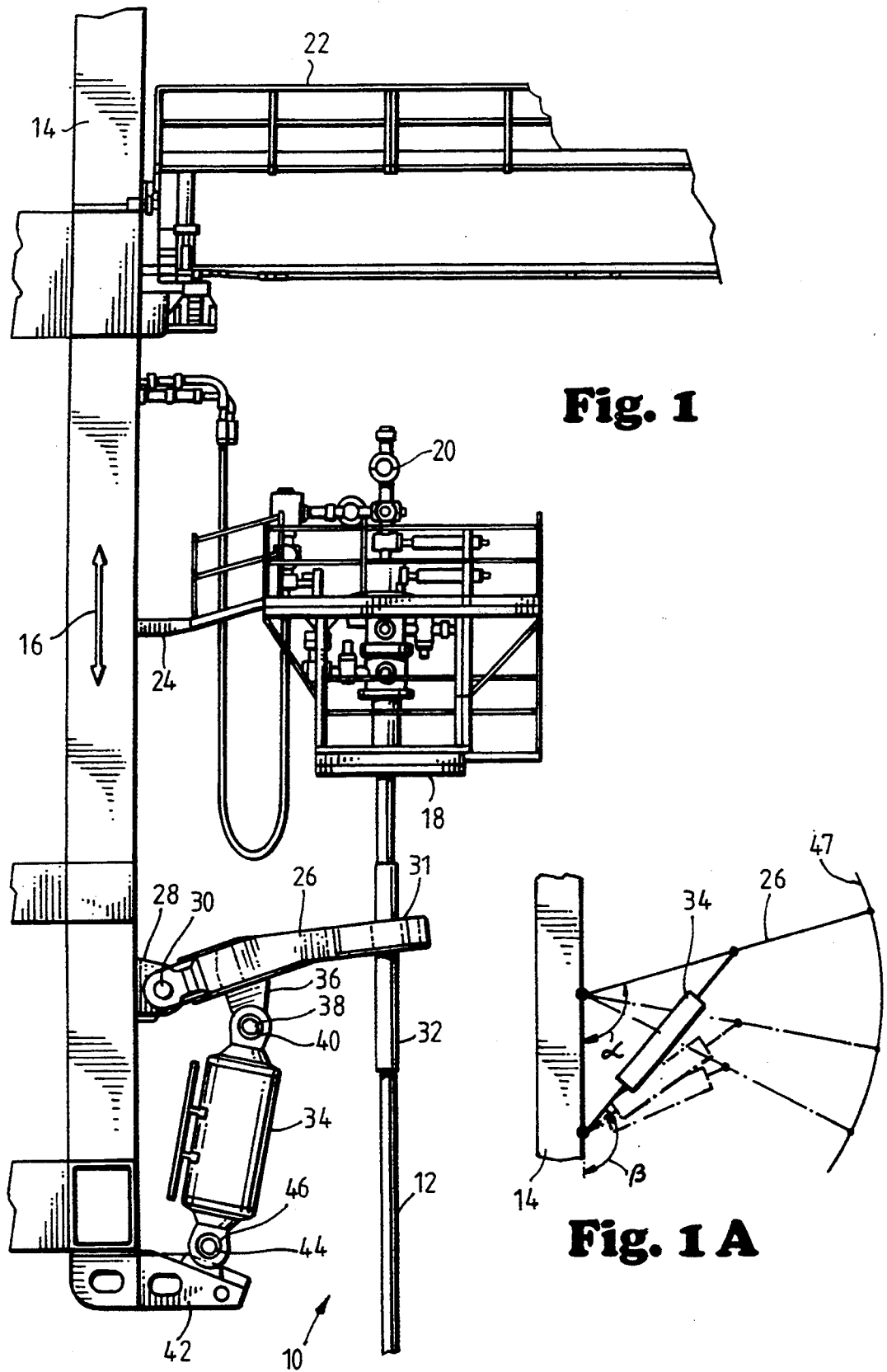
FIG. 1 illustrates a side view of a preferred riser tensioner system in a well bay of a floating platform.
FIG. 1A illustrates the movement of the system illustrated in FIG. 1.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DESCRIPTION OF THE PREFERRED EMBODIMENTS

Turning now to the drawings and referring initially to FIG. 1, a riser tensioner system is illustrated and generally designated by a reference numeral 10. The system 10 connects a riser pipe 12 to a portion of a floating platform 14. The system 10 allows the platform 14 to move relative to the riser 12 generally in the direction of the double-headed arrow 16, however, the system 10 also accommodates some lateral movement due to wind and current. The range of movement of the platform 14 with respect to the riser 12 is commonly referred to as the "riser stroke." Ideally, the system 10 minimizes the compressive stresses in the riser 12 as the riser "strokes" by applying a substantially constant force to maintain an upward tension on the riser 12.

As illustrated, the upper end of the riser 12 is connected to a well head platform 18 and a surface tree 20. Workers may access the surface tree 20 by traversing the well bay gantry 22 and descending down the platform 14 to a tree access walkway 24. The system 10 is coupled between the platform 14 and the riser 12 just below the wellhead platform 18.

The system 10 includes a rocker arm that is coupled between the riser 12 and the platform 14. At one end of the rocker arm 26, a pin 30 pivotally couples the arm 26 to a mounting bracket 28 on the platform 14. At the opposite end of the rocker arm 26, an elastomeric flex element 31 pivotally couples the arm 26 to a sleeve 32 on the riser 12.

The system 10 further includes an member 34 that applies a force to the riser 12 via the rocker arm 26. While only one member 34 is illustrated, a plurality of members may be used. At one end of the member 34, a pin 38 pivotally couples the member 34 to a mounting bracket 36. The mounting bracket 36 is connected to the underside of the rocker arm 26 and, typically, includes a teflon-lined bearing 40 on which the pin 38 pivots. At the opposite end of the member 34, a pin 44 pivotally couples the member 34 to a mounting bracket 42 on the platform 14. The mounting bracket 42 also typically includes a teflon-lined bearing 46 on which the pin 44 pivots. Alternatively, elastomeric bearings, or other suitable bearings or couplings, may be used instead of the teflon-lined bearings.

FIG. 1A illustrates the movement that the system 10 exhibits in response to the platform 14 moving relative to the riser 12 in the direction of the double-headed arrow 16. Initially, the angle $\alpha$ between the rocker arm 26 and the platform 14 is greater than 90°. As the platform 14 moves upwardly with respect to the riser 12, the end of the rocker arm 26 connected to the riser 12 moves along an arc 47 as the angle $\alpha$ becomes smaller. It should be noticed that the platform 14 and the riser 12 move closer to one another as the angle $\alpha$ increases past 90° and decreases past 90°. Also, during the illustrated movement the member 34 compresses. Although the force produced along the axis of the member 34 increases as it compresses, the angle $\beta$ between the member 34 and the platform 14 decreases, and, thus, the member 34 imparts a lessening amount of force in the vertical direction. Those skilled in the art can select the parameters of the system 10 to best suit the particular situation.

Figure 2:
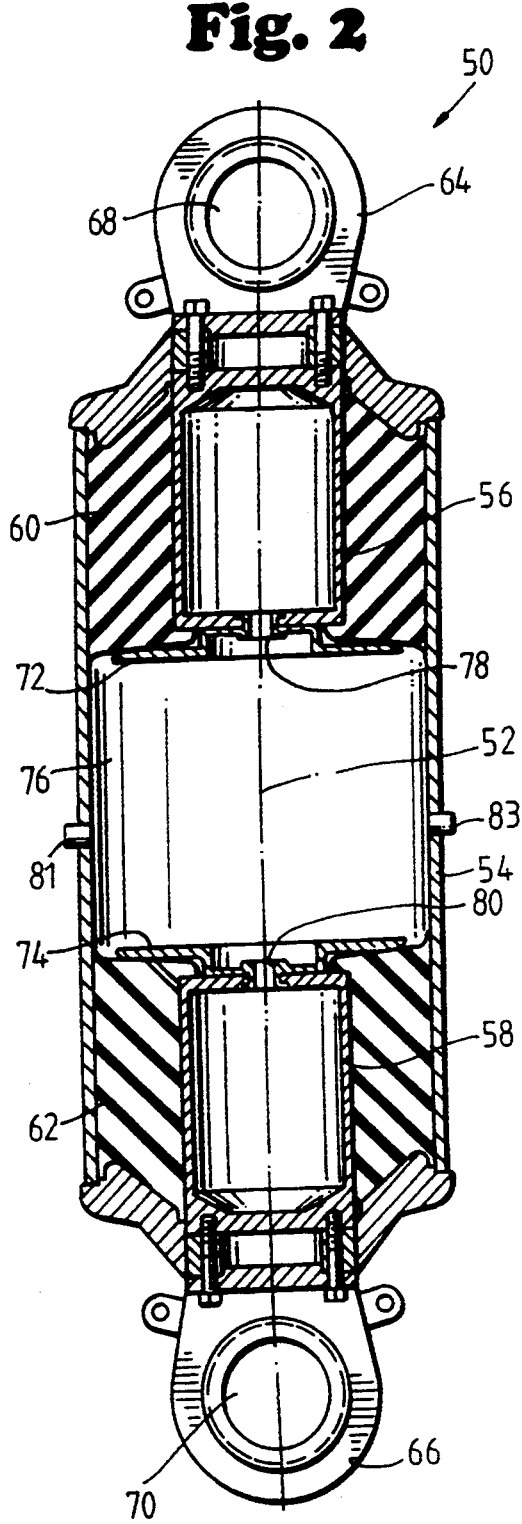
FIG. 2 illustrates a cross-sectional view of an energy cell having rubber and gas springs.

The member 34 may be an energy cell. FIG. 2 illustrates an energy cell 50 in its undeflected state. The energy cell 50 includes an outer cylinder 54 that is preferably formed of structural steel. A hollow, tubular piston 56 resides in one end of the cylinder 54, and a similar piston 58 resides in the other end of the cylinder 54. A rubber ring 60 and 62 is bonded between the outer surface of the respective piston 56 and 58 and the inner surface of the cylinder 54. Each rubber ring 60 and 62 acts as an elastomeric spring as the pistons 56 and 58 extend from and retract within the cylinder 54 in response to relative movement between the riser 12 and the platform 14.

The longitudinally outer end of each piston 56 and 58 is coupled to a respective connector 64 and 66. Each connector 64 and 66 has a respective aperture 68 and 70 therein to accept the respective pins 38 and 44. The longitudinally inner end of each piston 56 and 58 is coupled to a respective stop assembly 72 and 74. The stop assemblies 72 and 74 contact each other when the pistons 56 and 58 have retracted by a predetermined distance within the cylinder 54. The stop assemblies 72 and 74 prevent further retraction or compression of the pistons 56 and 58 and, thus, minimizes the risk of energy cell failure due to overcompression.

In addition to the rubber rings 60 and 62, the energy cell 50 also uses gas as a spring mechanism. It has been found that using a gas spring mechanism in combination with the rubber rings 60 and 62 produces a flatter spring rate over the range of motion of the energy cell 50 than using only the rubber springs. A gas cavity 76 is defined within the cylinder 54. Gas can be introduced into or extracted from the cavity 76 through couplings 81 and 83. Preferably, the longitudinally inner end of each piston 56 and 58 includes a respective inlet 78 and 80. The inlets 78 and 80 effectively increase the pressure within the gas cavity 76 so that the spring rate of the gas can be controlled with greater accuracy. Compression of the pistons 56 and 58 into the energy cell 50 produces relatively little volumetric change in the cavity 76. Thus, the pressure within the cavity 76 and the spring rate of the energy cell 50 remain relatively constant.

This type of energy cell was originally designed to absorb motion from the impact of a vessel docking or bumping into a floating platform. To best accomplish this function, the energy cell 50 has a relatively soft spring rate and is designed to accept loads along its longitudinal axis 52. Unfortunately, the pistons 56 and 58 possess a low resistance to rotation induced by force that is in a direction other than along the longitudinal axis 52. This compliance to rotation also performed a fendering function when the energy cell 50 was used in its original application. As the following discussion will make clear, if the energy cell 50 replaced the member 34 in the system 10, or in any other similar system, the forces exerted by system 10 tend to misalign the pistons 56 and 58 and cause an undesirable response from the energy cell 50.

If energy cell 50 were introduced into the riser tensioner system 10, the connector 64 would be pivotally coupled to the mounting bracket 36 by the pin 38, and the pin 38 would rotate within the teflon-lined bearing 40. Likewise, the connector 66 would be pivotally coupled to the mounting bracket 42 by the pin 44, and the pin 44 would rotate within the teflon-lined bearing 46. Because the pivot points are not frictionless as the rocker arm 26 pivots in response to the platform 14 moving relative to the riser 12, a torque input is introduced into the energy cell 50 due to the friction from the teflon-lined bearings 40 and 46.

FIG. 3, which generally illustrates the energy cell 50 of FIG. 2, illustrates the respective torque inputs to each of the pistons 56 and 58 by the respective curved arrows 90 and 92. The friction-induced torque is on the order of several hundred thousand inch/pounds, which is enough to cause rotation of the pistons 56 and 58 within the energy cell 50. It should be noticed that the pistons 56 and 58 tend to rotate about their respective centers of restraint 94 and 96. The arrows 98 and 100 illustrate the forces that resist the rotation produced by the respective torque inputs 90 and 92. These forces 98 and 100, of course, are primarily produced by the rubber rings 60 and 62.

FIG. 4 illustrates the pistons 56 and 58 as rotated within the energy cell 50 in response to the respective torque inputs 90 and 92. When the torque inputs 90 and 92 overcome the forces 98 and 100, an eccentricity or misalignment is produced between the center of the connector 64 and the center of the connector 66. This eccentricity is illustrated as the offset between lines 102 and 104. In its unloaded state, the eccentricity of the energy cell 50 is zero (or some small amount due to construction misalignment). However, the torque inputs 90 and 92 due to the frictional forces increase the eccentricity to a relatively large amount, such that the angle between the longitudinal axis of the pistons 56 and 58 and the longitudinal axis 52 of the energy cell 50 becomes about 3° to 5°.

Moreover, an additional torque is generated due to the affect of the eccentricity produced by the frictional forces coupled with the affect of the compression loading on the energy cell 50. Thus, as loading on the energy cell 50 increases as the platform 14 moves upwardly with respect to the riser 12, the eccentricity grows because the torque due to the compression loading input adds to the torque inputs 90 and 92. Typically, the component of the torque inputs 90 and 92 produced by the loading quickly overshadows the initial frictional components. As the riser continues to stroke, the torque inputs 90 and 92 cause an unstable reaction where the system 10 deflects farther than it should until the energy cell 50 fails due to structural overload.

The elastomeric tension strut 110 illustrated in FIG. 5 and hereinafter referred to as "ETS" minimizes this problem. The ETS 110 includes a pair of pistons 112 and 114 that move relative to one another within a cylinder 116 in response to relative movement between the platform 14 and the riser 12. Like the energy cell 50, the pistons 112 and 114 of the ETS 110 each carry a respective connector 118 and 120 at their longitudinally outer ends. Also, the pistons 112 and 114 have respective inlets 122 and 124 in their longitudinally inner ends and respective outlets 123 and 125 in their walls. These inlets 122, 123, 124 and 125 effectively increase the size of the gas cavity 126 between the pistons 112 and 114 to include the annular cavities 127 and 129 that surround the pistons 112 and 114. Thus, like the energy cell 50, the compression of the pistons 112 and 114 within the cylinder 116 produces relatively little volumetric change in the cavity 126.

In contrast to the energy cell 50, the ETS 110 utilizes a pair of elastomeric spring members around each piston 112 and 114. A main spring 128 is bonded between an end portion of the cylinder 116 and a longitudinally outer end portion of the piston 112. A secondary spring 132 is bonded between a more central portion of the cylinder 116 and a longitudinally inner end portion of the piston 112. A main spring 130 is bonded between an opposite end portion of the cylinder 116 and a longitudinally outer end portion of the piston 114. A secondary spring 134 is bonded between a more central portion of the cylinder 116 and a longitudinally inner end portion of the piston 114

Each of the main springs 128 and 130 are comprised of separate elastomeric layers which are laminated together. As illustrated, each main spring 128 and 130 includes three elastomeric layers 136, 138, 140, and 142, 144, 146, respectively. Each of these layers is separated from one another by a respective spacer. For instance, the layer 136 is separated from the layer 138 by a spacer 148, the layer 138 is separated from the layer 140 by a spacer 150, the layer 142 is separated from the layer 144 by a spacer 152, and the layer 144 is separated from the layer 146 by a spacer 154.

With respect to the main spring 128, the inner layer 140 is bonded to the piston 112, and the outer layer 136 is bonded to the inside of the cylinder 116. The intermediate layer 138 is bonded to the spacers 148 and 150, which are in turn bonded to the respective inner and outer layers 136 and 140. Similarly with respect to the main spring 130, the inner layer 146 is bonded to the piston 114, and the outer layer 142 is bonded to the inside of the cylinder 116. The intermediate layer 144 is bonded to the spacers 152 and 156, which are in turn bonded to the respective inner and outer layers 142 and 146. Preferably, the layers 136, 138, 140, 142, 144, and 146 are made of rubber or other suitable elastomeric material, and the spacers 148, 150, 152, and 154 are made from a metal, such as steel, or from a composite material, such as graphite epoxy.

Since the main springs 128 and 130 are laminated and include relatively inflexible spacers between the layers of elastomeric material, the main springs 128 and 130 are relatively stiff in the radial direction. However, the main springs 128 and 130 still exhibit good flexibility in the axial or longitudinal direction to allow the respective pistons 112 and 114 to extend from and retract within the cylinder 116 in response to relative movement between the platform 14 and the riser 12. Since the elastomeric layers in the main springs 128 and 130 are constrained more in the radial direction, they resist the torque inputs 90 and 92 to help prevent rotation of the pistons 112 and 114 in response to movement of the system 10.

Like the main springs 128 and 130, each of the secondary springs 132 and 134 are comprised of separate elastomeric layers which are laminated together. As illustrated, each secondary spring 132 and 134 includes five elastomeric layers 156, 158, 160, 162, 164 and 166, 168, 170, 172, 174, respectively. Each of these layers is separated from one another by a respective spacer. For instance, in the secondary spring 132, the layer 156 is separated from the layer 158 by a spacer 176, the layer 158 is separated from the layer 160 by a spacer 178, the layer 160 is separated from the layer 162 by a spacer 180, and the layer 162 is separated from the layer 164 by a spacer 182. In the secondary spring 134, the layer 166 is separated from the layer 168 by a spacer 184, the layer 168 is separated from the layer 170 by a spacer 186, the layer 170 is separated from the layer 172 by a spacer 188, and the layer 172 is separated from the layer 174 by a spacer 190.

With respect to the secondary spring 132, the inner layer 164 is bonded to the longitudinally inner end portion of the piston 112, and the outer layer 136 is bonded to the inside of the cylinder 116. The intermediate layers are bonded to the respective spacers. Similarly with respect to the secondary spring 134, the inner layer 174 is bonded to the longitudinally inner end portion of the piston 114, and the outer layer 166 is bonded to the inside of the cylinder 116. The intermediate layers are bonded to the respective spacers. Preferably, the layers 156, 158, 160, 162, 164, 166, 168, 170, 172, and 174 are made of rubber or other suitable elastomeric material, and the spacers 176, 178, 180, 182, 184, 186, 188, and 190 are made from a metal, such as steel, or from a composite material, such as a graphite epoxy.

Like the main springs 128 and 130, since the secondary springs 132 and 134 are laminated and include relatively inflexible spacers between the layers of elastomeric material, the secondary springs 132 and 134 are relatively stiff in the radial direction. However, the secondary springs 132 and 134 still exhibit good flexibility in the axial or longitudinal direction to allow the respective pistons 112 and 114 to extend from and retract within the cylinder 116 in response to relative movement between the platform 14 and the riser 12. Since the elastomeric layers in the secondary springs 132 and 134 are constrained more in the radial direction, they resist the torque inputs 90 and 92 and cooperate with the main springs 128 and 130 to substantially prevent rotation of the pistons 112 and 114 in response to movement of the system 10.

It is possible to solve the problem exhibited by the energy cell 50 without resorting to the two-piece elastomeric spring design used on each piston in the ETS 110. However, it should be understood that the axial stiffness of an energy cell is a function of the total amount of elastomeric material used in the springs. Thus, if each of the one-piece rubber rings 60 and 62 were replaced with a one-piece laminated rubber spring with relatively inelastic spacers, similar to the springs described in conjunction with the ETS 110, the pistons of the resulting ETS would resist rotation, but the axial stiffness of the ETS might be too great for many applications because of the additional elastomeric material added. In addition, manufacturing a laminated spring becomes more difficult as the axial length of the spring increases.

The two-piece springs in the ETS 110 overcome the problem of axial stiffness by providing a lesser total length to keep the axial stiffness of the springs within acceptable limits. The two-piece springs overcome the problem of eccentricity by positioning the main springs 128 and 130 on the longitudinally outer end portions of the respective pistons 112 and 114 and by positioning the secondary springs 132 and 134 on the longitudinally inner end portions of the respective pistons 112 and 114, so that the springs exert an optimum amount of force about the centers of rotation of the pistons and prevent misalignment.

The two-piece spring design is preferably manufactured using the following method. Again, only the springs 128 and 32 for the piston 112 are discussed with the understanding that the springs 130 and 134 for the piston 114 are manufactured in substantially the same way. First, the innermost elastomeric layers 140 and 164 are positioned on the piston 112, and the elastomeric layers 140 and 164 are vulcanized at the same time. Thus, the elastomeric layers 140 and 164 are preferably bonded to the piston 112 simultaneously.

Figure 10:
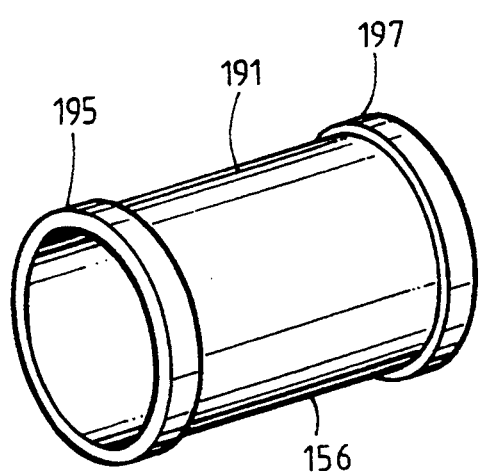
FIG. 10 illustrates an outer layer of a secondary spring having a pocket for accepting a bonding material.

The outermost elastomeric layers 136 and 156 are not vulcanized along with the innermost elastomeric layers 140 and 164. Instead, the outermost elastomeric layer 156 of the secondary spring 132 includes a pocket 191, as illustrated in FIG. 10. The pocket 191 is adapted to accept the introduction of an adhesive bonding material during a secondary bonding operation. The pocket 191 is preferably formed by a cylindrical indentation in the outer circumferential surface of the elastomeric layer 156. The opposing longitudinal end portions of the elastomeric layer 156 form lip seals 195 and 197 that prevent the adhesive bonding material from escaping from the pocket 191 during the secondary bonding operation.

The secondary bonding operation is preferably commenced after the elastomeric layers 140 and 164 are vulcanized and bonded to the piston 112. Preferably, the adhesive bonding material is introduced through a coupling 193 in the wall of the cylinder 116 adjacent the elastomeric layer 156. First, the inner surface of the cylinder 116 is cleaned and prepared for bonding. Then, the outermost elastomeric layer 156 of the secondary spring 132 is pressed into place within the cylinder 116. The lip seals 195 and 197 reduce the friction associated with the introduction of the elastomeric layer 156 into the cylinder 116 so that the elastomeric layer 156 does not deform as it is pressed into the cylinder 116. Once the elastomeric layer 156 is in place, the outermost elastomeric layer 136 of the main spring 128 is slid into place within the cylinder 116. The elastomeric layer 136 is not restrained by a press fit like the elastomeric layer 156, but is held in place by an assembly jig (not shown). Next, an adhesive bonding material, such as epoxy, is introduced into the pocket 191 through the coupling 193. Afterward, the entire assembly is placed into an autoclave and cured to form a bond between the elastomeric layer 136 and the inner surface of the cylinder 116 and to set the epoxy between the elastomeric layer 156 and the inner surface of the cylinder 116. Then, the intermediate elastomeric layers and spacers are bonded to one another and to their respective innermost and outermost elastomeric layers as is well known in the art.

The main springs 128 and 130 and the secondary springs 132 and 134 maintain their respective pistons 112 and 114 in a stable position as the pistons are deflected across their entire stroke range. The stroke range of piston 112 is illustrated in FIGS. 7, 8, and 9. It should be understood that the stroke range for piston 114 is similar. In FIG. 7, the piston 112 is illustrated as being in its fully extended position. In this position, the axial loads are the lowest, so the piston 112 receives the lowest amount of torque. Thus, neither of the springs 128 or 130 need be in their most stable position. As illustrated, the main spring 128 and the secondary spring 130 exhibit a flexion in the direction of the arrow 200.

FIG. 8 illustrates the piston 112 in its nominal position. In this position, the compressive forces on the ETS 110 are greater, so the piston 112 receives a greater torque input at the connector 118. To compensate for this greater torque, it should be noticed that the main spring 128 is in its most stable position, i.e., the elastomeric layers 136, 138, and 140 exhibit no flexion. Moreover, while the secondary spring 130 continues to exhibit flexion in the direction of the arrow 202, it is in a more stable position than when the piston 112 is in its fully extended position.

FIG. 9 illustrates the piston 112 in its fully compressed or fully retracted position. In this position, the axial loads are the highest, so the torsional input to the connector 118 is also the highest. To compensate for this high amount of torsional input, it should be noticed that the secondary spring 130 is in its most stable position, i.e., the elastomeric layers 156, 158, 160, 162, and 164 exhibit no flexion. Moreover, although the main spring 128 exhibits flexion in the direction of the arrow 204, it is still in a very stable position. Thus, the resulting change in the center of rotation as the springs 128 and 130 change strengths and stability relative to one another minimizes the effect of the eccentricity as the compressive or axial loads increase.

The system 10 was analyzed using classical columnar stability equations and found to have a minimum stiffness requirement of approximately 550 in-kips. The ETS 110 as illustrated in FIG. 5, has a resistance to rotation of approximately 800 in-kips. Thus, using the ETS 110 in the system 10 allows the system 10 to function properly and provides a significant margin to prevent unstable operation.

We claim:

1. An elastomeric strut comprising:
   a cylindrical housing having an elongated inner surface forming a cavity therein, having a first end portion and a second end portion, and having a longitudinal axis extending from said first end portion to said second end portion;
   a first piston means for moving between an extended position and a retracted position along said longitudinal axis within said first end portion of said housing;
   a second piston means for moving between an extended position and a retracted position along said longitudinal axis within said second end portion of said housing;
   a first main spring means for biasing said first piston means longitudinally inwardly when said first piston means is in its extended position and for biasing said first piston means longitudinally outwardly when said first piston means is in its retracted position;
   a second main spring means for biasing said second piston means longitudinally inwardly when said second piston means is in its extended position and for biasing said second piston means longitudinally outwardly when said second piston means is in its retracted position;
   a first secondary spring means for biasing said first piston means longitudinally inwardly when said first piston means is in its extended position, said first secondary spring means exhibiting no longitudinal bias when said first piston means is in its retracted position; and
   a second secondary spring means for biasing said first piston means longitudinally inwardly when said second piston means is in its extended position, said second secondary spring means exhibiting no longitudinal bias when said second piston means is in its retracted position.

2. The elastomeric strut, as set forth in claim 1, further comprising:
   a gas cavity formed within said housing between first piston means and said second piston means.

3. The elastomeric strut, as set forth in claim 3, wherein each of said first and second piston means comprise a respective hollow, tubular housing having a gas inlet in a longitudinally inner end of said respective hollow, tubular housing.

4. The elastomeric strut, as set forth in claim 3, wherein said cylindrical housing comprises a gas coupling, said gas coupling being formed in said cylindrical housing adjacent said gas cavity and being adapted to introduce gas to or expel gas from said gas cavity.

5. The elastomeric strut, as set forth in claim 1, wherein each of said spring means is comprised of a plurality of annular elastomeric layers, each of said plurality of annular elastomeric layers being separated from one another by a respective one of a plurality of annular spacers being bonded thereto, said annular spacers being relatively inelastic as compared with said annular elastomeric layers.

* * * * *

UNITED STATES PATENT AND TRADEMARK OFFICE
CERTIFICATE OF CORRECTION

PATENT NO. : 5,433,423
DATED : July 18, 1995
INVENTOR(S) : Gary L. Whightsil, Sr.

It is certified that error appears in the above-indentified patent and that said Letters Patent is hereby corrected as shown below:

Column 10, line 8, "32" should be --132--.

Column 12, line 31, "claim 3" should be --claim 2--.

Signed and Sealed this

Seventeenth Day of October, 1995

Attest:

BRUCE LEHMAN

Attesting Officer     Commissioner of Patents and Trademarks